(12) United States Patent
Sanders

(10) Patent No.: US 8,647,406 B2
(45) Date of Patent: *Feb. 11, 2014

(54) DUAL SALT FERTILIZER GIVING ENHANCED CROP YIELDS

(71) Applicant: Specialty Fertilizer Products, LLC, Leawood, KS (US)

(72) Inventor: John Larry Sanders, Leawood, KS (US)

(73) Assignee: Specialty Fertilizer Products, LLC, Leawood, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/785,232

(22) Filed: Mar. 5, 2013

(65) Prior Publication Data

US 2013/0174624 A1    Jul. 11, 2013

Related U.S. Application Data

(63) Continuation of application No. 13/345,357, filed on Jan. 6, 2012, now Pat. No. 8,430,943, which is a continuation of application No. 12/041,321, filed on Mar. 3, 2008, now abandoned.

(51) Int. Cl.

| | |
|---|---|
| *C05C 9/00* | (2006.01) |
| *C05C 1/00* | (2006.01) |
| *C05C 5/00* | (2006.01) |
| *C05C 5/02* | (2006.01) |
| *C05C 5/04* | (2006.01) |
| *C05C 9/02* | (2006.01) |
| *C05C 3/00* | (2006.01) |
| *C05B 3/00* | (2006.01) |
| *C05B 1/06* | (2006.01) |
| *C05B 5/00* | (2006.01) |
| *C05B 17/00* | (2006.01) |
| *C05B 7/00* | (2006.01) |

(52) U.S. Cl.
USPC ............... 71/28; 71/29; 71/30; 71/32; 71/33; 71/34; 71/35; 71/49; 71/50; 71/51; 71/53

(58) Field of Classification Search
USPC ............ 71/28, 29, 30, 32, 33, 34, 35, 49, 50, 71/51, 53
See application file for complete search history.

(56) References Cited

U.S. PATENT DOCUMENTS 6,756,461 B2 * 6/2004 Sanders et al. ................. 526/321
8,430,943 B2 * 4/2013 Sanders ............................ 71/29

* cited by examiner

*Primary Examiner* — Wayne Langel
(74) *Attorney, Agent, or Firm* — Hovey Williams LLP

(57) ABSTRACT

Multiple-component fertilizer materials and methods of use are provided, wherein the fertilizer materials include first and second fertilizer products respectively including an ammoniacal fertilizer (e.g., urea) in combination with a partial calcium salt of a selected copolymer, and a phosphorous fertilizer (e.g., DAP) in combination with a partial sodium salt of a selected copolymer. The copolymer fractions of the first and second fertilizer products are most preferably copolymers of itaconic acid and maleic anhydride. The fertilizer materials give synergistically enhanced crop yields when applied to soil or growing plants.

27 Claims, No Drawings

DUAL SALT FERTILIZER GIVING ENHANCED CROP YIELDS

CROSS REFERENCE TO RELATED APPLICATION

This application is a continuation of application Ser. No. 13/345,357, filed Jan. 6, 2012, which is a continuation of application Ser. No. 12/041,321, filed Mar. 3, 2008, both of which are incorporated herein by reference in their entirety.

BACKGROUND OF THE INVENTION

1. Field of the Invention

The present invention is broadly concerned with dual-component fertilizer materials and methods of use thereof wherein the fertilizer material provides enhanced yields of crops. More particularly, the present invention is concerned with such fertilizer materials comprising a first fertilizer product including an ammoniacal fertilizer and a partial calcium salt of a copolymer, along with a second fertilizer product including a phosphorous fertilizer and a partial sodium salt of a copolymer; the first and second fertilizer products are used in synergistically effective amounts in order to increase crop yields.

2. Description of the Prior Art

Plants have been fertilized with various materials since the dawn of agriculture. Fertilizers have included manure products as well as ammoniacal nitrogen materials (e.g., anhydrous ammonia and urea), and phosphorous fertilizers such as ammonium polyphosphate and other products derived from phosphate rock. A worldwide industry provides modern-day fertilizers of desired N—P—K grades in a bewildering variety of combinations.

In recent years a series of U.S. patents have issued describing biodegradable polymers having significant agricultural facilities, particularly when used in combination with conventional fertilizers. For example, U.S. Pat. No. 6,515,090 describes dicarboxylic copolymers made up, e.g., of moieties of itaconic acid and maleic anhydride. This patent also discloses that such copolymers may be partially neutralized with metal or other cations, and can be used to form composite products with fertilizers. These combined fertilizer-copolymer products have been shown to increase the availability of phosphorous for uptake by growing plants, and can be applied to soil adjacent the plants or in foliar applications. Polymers in accordance with the '090 patent are commercially available from Specialty Fertilizer Products of Belton, Mo. under the designations NUTRISPHERE-N® and AVAIL®.

SUMMARY OF THE INVENTION

The present invention is predicated upon the discovery that multiple-component fertilizer materials can be provided which give synergistically enhanced crop yields. Such fertilizer materials broadly include a first fertilizer product including an ammoniacal fertilizer and a partial calcium salt of a first copolymer, and a second fertilizer product including a phosphorous fertilizer and a partial sodium salt of a second copolymer. These fertilizer products are present in synergistically effective amounts for a particular crop. The preferred copolymers are of the type described in U.S. Pat. No. 6,515,090, which is incorporated by reference herein.

In particularly preferred forms, the first fertilizer product includes a conventional fertilizer such as urea in combination with an aqueous dispersion of a partial calcium salt of a copolymer made up of substantially equimolar amounts of itaconic acid and maleic anhydride moieties and having a pH on the order of 1-5. The second fertilizer product includes a fertilizer such as diammonium phosphate (DAP) or liquid polyammonium phosphate in combination with a partial sodium salt of the same copolymer.

DETAILED DESCRIPTION OF THE PREFERRED EMBODIMENT

The preferred methods of the invention comprise the steps of fertilizing by application to soil and/or plants of a fertilizer material comprising synergistically effective amounts of respective first and second fertilizer products. The first fertilizer product is a blend of an ammoniacal fertilizer with a minor amount of a partial calcium salt of one or more copolymers of a selected class thereof, while the second fertilizer product is a blend of a phosphorous fertilizer and a partial sodium salt of one or more of the copolymer class. "Synergistically effective amounts" of the first and second fertilizer products refers to coordinated amounts of each of the fertilizer products which in combination give an increased crop yield in excess of the crop yield which could be obtained by individual application of the first and second fertilizer products in those amounts; stated otherwise, the coordinated amounts of the first and second fertilizer products give crop yields greater than a mere additive effect obtainable through the use of the respective fertilizer products alone in the same amounts. It will be appreciated that the synergistically effective amounts of the first and second fertilizer products are directed to particular crops, and that, depending upon the crop in question, soil conditions, ambient weather, and other factors, the first fertilizer product may be present in a greater amount as compared with the second fertilizer product, or vice versa. Generally speaking, however, the first ammoniacal fertilizer product is usually present in an amount of from about 30-200 lbs. N/acre, and more preferably from about 50-150 lbs. N/acre. The second phosphorous fertilizer product is usually present in a lesser amount as compared with the first ammoniacal fertilizer product and generally from about 10-80 lbs. P205/acre, more preferably from about 20-50 lbs. P205/acre.

The first fertilizer product includes an ammoniacal fertilizer. Any one of the number of such fertilizers may be used in this context. Exemplary ammoniacal fertilizers include ammoniacal nitrogen-containing fertilizer, such as those selected from the group consisting of ammonia, ammonium nitrate, ammonium sulfate, urea, monoammonium phosphate, diammonium phosphate, sodium nitrate, calcium nitrate, potassium nitrate, nitrate of soda, urea formaldehyde, methyl ammonium phosphate, ammoniated super phosphate, and mixtures thereof. The fertilizer is preferably in solid or liquid form, with the most preferred fertilizer being granular urea.

The copolymer fraction of the first fertilizer product comprises a partial calcium salt of one or more members of a class of copolymers including recurring polymeric subunits each made up of at least two different moieties individually and respectively taken from the group consisting of A, B, and C moieties, or recurring C moieties, and C moieties which are not different, wherein moiety A is of the general formula $$-\!\!\left(\!\text{CH}-\text{CH}\!\right)\!\!-\!\!$$
$$\phantom{xxxxx}|\phantom{xx}|$$
$$\phantom{xxxx}R_1\phantom{x}R_2$$

moiety B is of the general formula

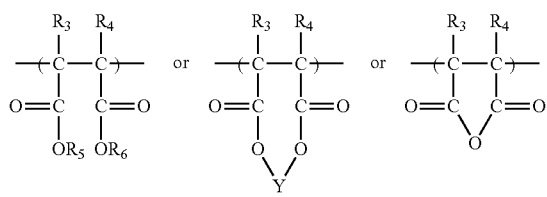

and moiety C is of the general formula

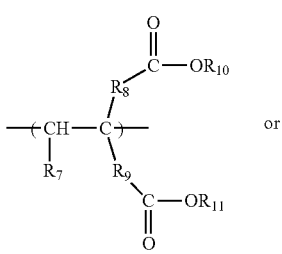

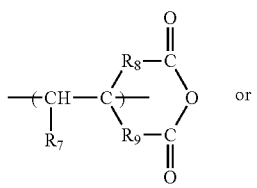

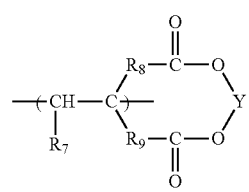

wherein $R_1$, $R_2$ and $R_7$ are individually and respectively selected from the group consisting of H, OH, $C_1$-$C_{30}$ straight, branched chain and cyclic alkyl or aryl groups, $C_1$-$C_{30}$ straight, branched chain and cyclic alkyl or aryl $C_1$-$C_{30}$ based ester groups (formate ($C_0$), acetate ($C_1$), propionate ($C_2$), butyrate ($C_3$), etc. up to $C_{30}$), R'$CO_2$ groups, and OR' groups, wherein R' is selected from the group consisting of $C_1$-$C_{30}$ straight, branched chain and cyclic alkyl or aryl groups; $R_3$ and $R_4$ are individually and respectively selected from the group consisting of H, $C_1$-$C_{30}$ straight, branched chain and cyclic alkyl or aryl groups; $R_5$, $R_6$, $R_{10}$ and $R_{11}$ are individually and respectively selected from the group consisting of H, the alkali metals, $NH_4$ and the $C_1$-$C_4$ alkyl ammonium groups, Y is selected from the group consisting of Fe, Mn, Mg, Zn, Cu, Ni, Co, Mo, V, Cr, Si, B, and Ca; $R_8$ and $R_9$ are individually and respectively selected from the group consisting of nothing, $CH_2$, $C_2H_4$, and $C_3H_6$. In many instances, at least one of the $R_3$, $R_2$ and $R_7$ groups is OH where the polymeric subunits are made up of A and C moieties, and at least one of the $R_1$, $R_2$, $R_3$, $R_4$, and $R_7$ groups is OH where the polymeric subunits are made up of A, B and C moieties

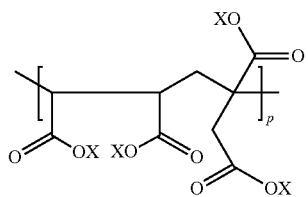

The more preferred class of polymers have the generalized formula
where X is a cation and p ranges from about 10-500. At least some of the X substituents are calcium, whereas others may be different metal cations (e.g., alkali and alkaline earth metal cations), and some are H. Thus, the copolymers exist as a partial salt or complex.

The first fertilizer product may be formed by any convenient means of mixing of the fertilizer and polymer fractions. For example, in the case of solid fertilizers, the polymer is most conveniently applied by spraying or dipping. Where liquid fertilizers are used, the copolymer is usually mixed into the liquid with appropriate stirring. However, it is also possible to separately apply the fertilizer and polymer materials to a field either simultaneously or seriatim, although this is normally not preferred.

The first fertilizer product copolymer fraction is normally an aqueous liquid product having a solids content of from about 20-80% by weight, more preferably from about 30-50% by weight, and a pH of from about 1-5, more preferably from about 2-3.5.

The second fertilizer product includes a phosphorous fertilizer, such as monoammonium phosphate (MAP), diammonium phosphate (DAP), calcium phosphates (normal phosphate and super phosphate), ammonium phosphate, ammonium super phosphate, ammonium polyphosphate, phosphoric acid, basic slag, rock phosphate, colloidal phosphate, bone phosphate, ammonium sulfate, ammonium thiosulfate, and mixtures thereof. The copolymer fraction of the second fertilizer products are made up of one or more partial sodium salts of the same class of copolymers defined above with respect to the first fertilizer products. The second fertilizer product copolymer fraction is normally an aqueous liquid product having a solids content of from about 20-80% by weight, more preferably from about 30-50% by weight, and a pH of from about 5-10, more preferably from about 6-8. The second fertilizer product can be prepared in the same fashion as the first fertilizer product.

The levels of copolymer use for the first and second fertilizer products are substantially the same. Specifically, the copolymer salts in each case should normally be present in the first and second fertilizer products at a level of from about 0.01-2.0% by volume, and more preferably from about 0.1-0.5% by volume, based upon the total volume of the respective fertilizer product taken as 100% by volume.

The first and second fertilizer products can be used in various ways, so long as both products are present on or about plants or the soil adjacent plants. For example, the fertilizer products can be separately formulated and applied to soil or plants substantially simultaneously or in serial order. In another alternative, the first and second fertilizer products can be blended together and applied in that condition. Depending upon the type of fertilizer product employed and whether a solid or a liquid, the products can be applied by spreading or broadcast.

The methods of the invention are useful with a virtually unlimited number of crops, so long as the crop benefits from dual fertilization. Exemplary crops are those selected from the groups consisting of corn, wheat, oats, barley, sorghum, milo, rice, cotton, soybean, and alfalfa, and other forage crops. Excellent results have been achieved with a first fertilizer product made up of a partial calcium salt of an itaconic/ maleic copolymer. Similarly, a second fertilizer product may be formulated using the same itaconic/maleic copolymer partially neutralized with sodium cation.

The following examples set forth yield tests using fertilizers supplemented with the preferred calcium and sodium partial salt copolymers of the invention. It is to be understood, however, that these examples are provided by way of illustration and nothing therein should be taken as a limitation upon the overall scope of the invention.

Example 1

In this experiment, the interaction was investigated of granular urea fertilizer treated with a partial calcium salt copolymer and diammonium phosphate (DAP) fertilizer treated with a partial sodium salt copolymer, upon the yield of Bromegrass. The experiment was conducted at an experimental field located near Scandia, Kans., on a Crete silt loam soil. The treatments included two rates of nitrogen (N) application of 60 and 100 lbs. N/acre applied as granular urea alone or granular urea treated with the partial calcium salt copolymer. Additional treatments included application of 30 lbs. P205/acre as DAP alone or DAP treated with the partial sodium salt copolymer. An untreated check plot was also included.

The experiment was conducted in an area with an established stand of Bromegrass that was four years old and had never been fertilized. All fertilizer applications were surface-applied and broadcast. Nitrogen and phosphorous fertilizer applications were made separately on March 20. The plots were harvested on May 18. Subsamples of the forage material were taken from each plot at harvest, weighed, dried, and then weighed again to determine forage dry weight. Yields are reported in lbs./acre on a dry weight basis. Soil test results from the experimental area were pH 6.8, organic matter 2.8%, Bray-1 P 18 ppm, and exchangeable K 290 ppm.

The urea+ copolymer material was prepared by spraying liquid copolymer at a level of 0.25% by volume onto granular urea (½ gallon liquid copolymer per ton of urea) in order to achieve substantial homogeneity. The polymer was commercially available NUTRISPHERE-N® for urea (NSN) commercialized by Specialty Fertilizer Products of Belton, Mo. This polymer is a 40% by weight solids aqueous copolymer of substantially equimolar amounts of itaconic and maleic anhydride moieties partially neutralized with calcium ion (CAS#877469-38-0) and having a pH of 2.5-5.

The DAP+ copolymer was similarly prepared by spraying liquid copolymer at a level 0.25% by volume onto granular DAP (½ gallon liquid copolymer per ton of DAP) in order to achieve substantial homogeneity. The polymer was commercially available AVAIL® sold by Specialty Fertilizer Products of Belton, Mo. This polymer is a 40% by weight solids aqueous copolymer of substantially equimolar amounts of itaconic and maleic anhydride moieties partially neutralized with sodium ion (CAS#556055-76-6) and having a pH of 6-8.

The following table sets forth the results of this experiment, where lbs. N/Acre refers to application of untreated granular urea, lbs. N/Acre+NSN refers to application of NSN-supplemented granular urea, lbs. P205/Acre refers to application of untreated DAP, and lbs. P205/Acre+AVAIL refers to application of AVAIL-supplemented DAP.

TABLE 1

| Treatments lbs. N/Acre and/or lbs. P205/Acre | Yield lbs./Acre Dry Weight |
|---|---|
| 0 lbs. N/Acre and 0 lbs. P205/Acre (Check Plot) | 1982 F |
| 60 lbs. N/Acre and 30 lbs. P205/Acre | 2128 F |
| 120 lbs. N/Acre and 30 lbs. P205/Acre | 3445 E |
| 60 lbs. N/Acre + NSN and 30 lbs. P205/Acre | 6346 C |
| 120 lbs. N/Acre + NSN and 30 lbs. P205/Acre | 5342 D |
| 60 lbs. N/Acre and 30 lbs. P205/Acre + AVAIL | 6891 B |
| 120 lbs. N/Acre and 30 lbs. P205/Acre + AVAIL | 6356 C |
| 60 lbs. N/Acre + NSN and 30 lbs. P205/Acre + AVAIL | 7187 AB |
| 120 lbs. N/Acre + NSN and 30 lbs. P205/Acre + AVAIL | 7306 A |
| 0 lbs. N/Acre and 30 lbs. P205/Acre + AVAIL | 2096 F |
| LSD (0.05) | 313 |
| CV % | 3.6 |

Means were separated using Duncan's Multiple Range Test. Means followed by the same letter are not significantly different.

The greatest forage yields were achieved with the application of urea+NSN in combination with DAP+AVAIL. The field was very responsive to N and P. The efficiencies of both N and P were improved with the use of the NSN and AVAIL polymers.

Example 2

In this experiment, the interaction was investigated of liquid urea-ammonium nitrate fertilizer (28% UAN) treated with a partial calcium salt copolymer and ammonium polyphosphate (APP, 10-34-0) fertilizer treated with a partial sodium salt copolymer, upon the yield of corn. The experiment was conducted at an experimental field located near Scandia, Kans., on a Crete silt loam soil. The treatments included two rates of nitrogen (N) application of 160 and 240 lbs. N/acre using UAN alone and UAN supplemented with the partial salt copolymer. Additional treatments included application of 30 lbs. P205/acre as APP alone or APP supplemented with the partial sodium salt copolymer. An untreated check plot was also included. Soil test results from the experimental area were pH 6.8, organic matter 2.8%, Bray-1 P 18 ppm, and exchangeable K 290 ppm.

Nitrogen fertilizer was broadcast onto the soil surface into the residue from the previous year's soybean crop on April 27. The phosphorous fertilizer was applied as a starter on the soil surface 2 inches to the side of the row at corn planting on April 30 without any additional tillage. The planted corn was hybrid Pioneer 33B51 used at a rate of 32,000 seed/Acre. The field was irrigated six times during the growing season with 1.25 inches of water applied at each irrigation. The corn was harvested on November 1.

The UAN+ copolymer material was prepared by mixing liquid copolymer at a level of 0.50% by volume into liquid UAN in order to achieve substantial homogeneity. The polymer was commercially available NUTRISPHERE-N® for liquid fertilizers (NSN) commercialized by Specialty Fertilizer Products of Belton, Mo. This polymer is a 40% by weight solids aqueous copolymer of substantially equimolar amounts of itaconic and maleic anhydride moieties partially neutralized with calcium ion (CAS#877469-38-0) and having a pH of 1-2.

The APP+ copolymer was similarly prepared by mixing liquid copolymer at a level 0.50% by volume into liquid APP in order to achieve substantial homogeneity. The polymer was commercially available AVAIL® sold by Specialty Fertilizer Products of Belton, Mo. This polymer is a 40% by weight solids aqueous copolymer of substantially equimolar amounts of itaconic and maleic anhydride moieties partially neutralized with sodium ion (CAS#556055-76-6) and having a pH of 6-8.

The following table sets forth the results of this experiment, where lbs. N/Acre refers to application of untreated UAN, lbs. N/Acre+NSN refers to application of NSN-supplemented UAN, lbs. P205/Acre refers to application of untreated APP, and lbs. P205/Acre+AVAIL refers to application of AVAIL-supplemented APP.

TABLE 2

| Treatments lbs. N/Acre and/or lbs. P205/Acre | Yield bu/Acre |
| --- | --- |
| 0 lbs. N/Acre and 0 lbs. P205/Acre (Check Plot) | 148.7 F |
| 160 lbs. N/Acre and 30 lbs. P205/Acre | 227.7 E |
| 240 lbs. N/Acre and 30 lbs. P205/Acre | 323.3 E |
| 160 lbs. N/Acre and 30 lbs. P205/Acre + AVAIL | 240.8 D |
| 240 lbs. N/Acre and 30 lbs. P205/Acre + AVAIL | 243.6 CD |
| 160 lbs. N/Acre + NSN and 30 lbs. P205/Acre | 251.1 B |
| 240 lbs. N/Acre + NSN and 30 lbs. P205/Acre | 248.7 BC |
| 160 lbs. N/Acre + NSN and 30 lbs. P205/Acre + AVAIL | 258.6 A |
| 240 lbs. N/Acre + NSN and 30 lbs. P205/Acre + AVAIL | 260.5 A |
| LSD (0.05) | 6.8 |
| CV % | 3.0 |

Means were separated using Duncan's Multiple Range Test. Means followed by the same letter are not significantly different.

Maximum corn yield in this experiment was achieved with UAN+NSN applied at either 160 or 240 lbs. N/Acre along with AVAIL-treated APP applied as a starter at planting. NSN-treated UAN with APP alone gave greater yields than UAN alone with APP alone. At the 160 lbs. N/Acre rate, the addition of the two polymers resulted in a 31 bu/Acre yield increase over N and P applied alone. Yield benefit was maximized with the use of both the NSN and AVAIL copolymers. This study indicates that the efficiencies of both N and P containing fertilizers can be greatly improved by the addition of the copolymers.

I claim:

1. A fertilizer material adapted for fertilizing a crop and comprising:
    a first fertilizer product including an ammoniacal fertilizer selected from the group consisting of ammoniacal nitrogen-containing fertilizer, and a partial calcium salt of a first copolymer comprising maleic and itaconic monomers, said partial calcium salt of said first copolymer applied to or mixed with said ammoniacal fertilizer as an aqueous liquid product and having a pH of from about 1-3.5; and
    a second fertilizer product including a phosphorous fertilizer and a partial sodium salt of a second copolymer comprising maleic and itaconic monomers, said partial sodium salt of said second copolymer applied to or mixed with said phosphorous fertilizer as an aqueous liquid product and having a pH of from about 5-10,
    said first and second fertilizer products being present in synergistically effective amounts, such that the coordinated amounts of said first and second fertilizer products give crop yields greater than a mere additive effect obtainable through the use of the respective first and second fertilizer products alone in the same amounts.

2. The fertilizer material of claim 1, said partial calcium salt of said first copolymer being mixed with said ammoniacal fertilizer product at a level of from about 0.01-2% by volume, based upon the total volume of the first fertilizer product taken as 100% by volume.

3. The fertilizer material of claim 2, said level being about 0.1-0.5% by volume.

4. The fertilizer material of claim 1, said partial sodium salt of said second copolymer being mixed with said phosphorous fertilizer product at a level of from about 0.01-2% by volume, based upon the total volume of the second fertilizer product taken as 100% by volume.

5. The fertilizer material of claim 4, said level being about 0.1-0.5% by volume.

6. The fertilizer material of claim 1, said polymer having the generalized formula

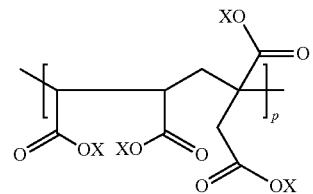

where X is a cation and p ranges from about 10-500.

7. The fertilizer material of claim 6, wherein at least some of said X substituents are metal cations, and some are H.

8. The fertilizer material of claim 1, said ammoniacal fertilizer selected from the group consisting of ammonia, ammonium nitrate, ammonium sulfate, urea, monoammonium phosphate, diammonium phosphate, sodium nitrate, calcium nitrate, potassium nitrate, nitrate of soda, urea formaldehyde, methyl ammonium phosphate, ammoniated super phosphate, and mixtures thereof.

9. The fertilizer material of claim 1, said phosphorous fertilizer selected from the group consisting of monoammonium phosphate (MAP), diammonium phosphate (DAP), calcium phosphates (normal phosphate and super phosphate), ammonium phosphate, ammonium super phosphate, ammonium polyphosphate, phosphoric acid, basic slag, rock phosphate, colloidal phosphate, bone phosphate, and mixtures thereof.

10. The fertilizer material of claim 1, said ammoniacal fertilizer being a liquid or solid fertilizer.

11. The fertilizer material of claim 1, said first and second copolymers being the same.

12. The fertilizer material of claim 1, said first and second copolymers each containing moieties of itaconic acid and maleic anhydride.

13. A method of fertilizing a crop, comprising the steps of:
    applying a fertilizer material onto soil in which said crop will grow, said fertilizer material including
    a first fertilizer product including an ammoniacal fertilizer selected from the group consisting of ammoniacal nitrogen-containing fertilizer, and a partial calcium salt of a first copolymer comprising maleic and itaconic monomers, said partial calcium salt of said first copolymer applied to or mixed with said ammoniacal fertilizer as an aqueous liquid product and having a pH of from about 1-3.5; and
    a second fertilizer product including a phosphorous fertilizer and a partial sodium salt of a second copolymer comprising maleic and itaconic monomers, said partial sodium salt of said second copolymer applied to or mixed with said phosphorous fertilizer as an aqueous liquid product and having a pH of from about 5-10,
    said first and second fertilizer products being present in synergistically effective amounts, such that the coordinated amounts of said first and second fertilizer products give crop yields greater than a mere additive effect obtainable through the use of the respective first and second fertilizer products alone in the same amounts.

14. The method of claim 13, said partial calcium salt of said first copolymer being mixed with said ammoniacal fertilizer product at a level of from about 0.01-2% by volume, based upon the total volume of the first fertilizer product taken as 100% by volume.

15. The method of claim 14, said level being about 0.1-0.5% by volume.

16. The method of claim 13, said partial sodium salt of said second copolymer being mixed with said phosphorous fertilizer product at a level of from about 0.01-2% by volume, based upon the total volume of the second fertilizer product taken as 100% by volume.

17. The method of claim 16, said level being about 0.1-0.5% by volume.

18. The method of claim 13, said polymer having the generalized formula

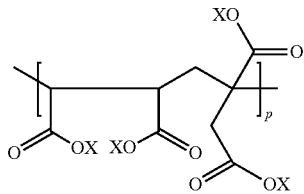

where X is a cation and p ranges from about 10-500.

19. The method of claim 18, wherein at least some of said X substituents are metal cations, and some are H.

20. The fertilizer material of claim 13, said ammoniacal fertilizer selected from the group consisting of ammonia, ammonium nitrate, ammonium sulfate, urea, monoammonium phosphate, diammonium phosphate, sodium nitrate, calcium nitrate, potassium nitrate, nitrate of soda, urea formaldehyde, methyl ammonium phosphate, ammoniated super phosphate, and mixtures thereof.

21. The fertilizer material of claim 13, said phosphorous fertilizer seclected from the group consisting of monoammonium phosphate (MAP), diammonium phosphate (DAP), calcium phosphates (normal phosphate and super phosphate), ammonium phosphate, ammonium super phosphate, ammonium polyphosphate, phosphoric acid, basic slag, rock phosphate, colloidal phosphate, bone phosphate, and mixtures thereof.

22. The method of claim 13, said ammoniacal fertilizer being a liquid or solid fertilizer.

23. The method of claim 13, said first and second copolymers being the same.

24. The method of claim 14, said first and second copolymers each containing moieties of itaconic acid and maleic anhydride.

25. The method of claim 13, said first and second fertilizer products being applied substantially simultaneously.

26. The method of claim 13, said first and second fertilizer products being applied in serial order.

27. The method of claim 13, said first and second fertilizer products being mixed together and applied.

* * * * *